(12) United States Patent
Agrawal et al.

(10) Patent No.: US 7,653,673 B1
(45) Date of Patent: Jan. 26, 2010

(54) EFFICIENT METHOD FOR IDENTIFYING FEW LARGEST DIFFERENCES FROM A LIST OF NUMBERS

(75) Inventors: Himanshu Agrawal, Bangalore (IN); Partha Ray, Bangalore (IN)

(73) Assignee: National Semiconductor Corporation, Santa Clara, CA (US)

( * ) Notice: Subject to any disclaimer, the term of this patent is extended or adjusted under 35 U.S.C. 154(b) by 815 days.

(21) Appl. No.: 11/184,118

(22) Filed: Jul. 19, 2005

(51) Int. Cl.
*G06F 7/02* (2006.01)

(52) U.S. Cl. ...................................... 708/200

(58) Field of Classification Search ........................ None
See application file for complete search history.

(56) References Cited

U.S. PATENT DOCUMENTS

| 4,414,676 A | * | 11/1983 | Kraul et al. | .................. 375/368 |
| 4,695,971 A | * | 9/1987 | Reimann | ...................... 708/671 |
| 2004/0064490 A1 | * | 4/2004 | Saitou et al. | ................. 708/200 |

* cited by examiner

*Primary Examiner*—David H Malzahn
(74) *Attorney, Agent, or Firm*—Dergosits & Noah LLP

(57) ABSTRACT

A method is provided that finds the largest 'k' difference values in decreasing order from a list of 'n' arbitrary numbers. The method uses the property of sorted numbers to organize the list of all the differences in a way that reduces the size of the solution space. The time complexity of the solution space using the method is $O(k^2)$, as compared to $O(n^2)$ in the conventional exhaustive method. The overall time complexity of the method is bound by the complexity of the algorithm used to sort the input list of numbers. The memory complexity of the method is less than the exhaustive method when $k \ll n$.

1 Claim, 1 Drawing Sheet

EFFICIENT METHOD FOR IDENTIFYING FEW LARGEST DIFFERENCES FROM A LIST OF NUMBERS

TECHNICAL FIELD

The present invention is directed to computer assisted data processing techniques and, in particular, to an efficient method for finding the largest 'k' difference values in decreasing order from a list of 'n' arbitrary numbers.

DESCRIPTION OF THE INVENTION

There are numerous applications, such as clock-skew analysis in digital integrated circuit (IC) design, in which it is necessary to find the few largest difference (e.g., skew) values. The inputs for the clock skew application are the delays associated with the clock pins of all sequential elements in the IC design. This particular clock-skew application is discussed in greater detail below.

It is desirable that any program operation, such as clock-skew analysis, that is implemented in a data processing system be simple and efficient. That is, the program should include as few instructions or steps as possible so that a minimum amount of system memory is required to store the program implementation and so that the running time of the program implementation on the data processing system is as short as possible.

Figure 1:
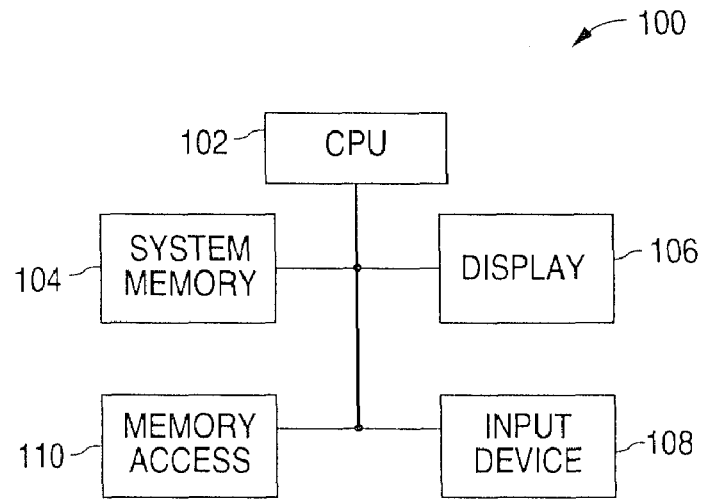
FIG. 1 is a block diagram illustrating a conventional data processing system.

FIG. 1 shows the well-known general architecture of a data processing system 100 that can be utilized in executing a program implementation of a method for identifying the few largest differences from a list of numbers. The data processing system 100 includes a central processing unit (CPU) 102 and a system memory 104 that is connected to the CPU 102. The system memory 104 typically stores the operating system for the CPU 102 as well as data and various sets of program instructions for applications programs to be executed by the system 100. For example, the system memory 104 could store the software program, i.e. the sequence of program instructions, needed to implement a method for identifying the few largest differences from a list of numbers in accordance with the present invention. Typically, the computer system 100 also includes a display 106 that is connected to the CPU to allow images to be displayed to a user, a user input system 108 that allows the user to interact with the system 100, and a memory access system 110 that enables transfer data both within the system 100 and between the system 100 and systems external to the system 100, e.g. a computer network to which the system 100 is connected. All of these components and the ways in which they interact are well known to persons skilled in the art.

According to the conventional exhaustive search method for finding the largest differences in a set of numbers, an arbitrary set of n distinct numbers $$X = \{x_1, x_2, \ldots, x_n\}$$

is provided as input to a data processing system. All possible differences are then computed to create the solution space by subtracting each number in set X from every other number in the set. For example, there will be (n−1) possible difference values by subtracting the first number $x_1$ with all the other numbers $(x_2 \ldots x_n)$ in the set X. Then, there will be (n−2) difference values by subtracting $x_2$ with all the remaining numbers $(X_3 \ldots x_n)$ in set X. Thus, the size of the solution set for the problem is $$S = (n-1) + (n-2) + (n-3) + \ldots + (n-(n-1))$$
$$= (n^2 - n)/2$$

The time complexity for this approach is $T = O(n^2)$. (Those skilled in the art will appreciate that the "big-O" notation for the time complexity describes the asymptotic upper bound for the magnitude of the function.)

The next step in the exhaustive method is to select the largest 'k' difference values from the set of $(n^2-n)/2$ values using any well-known partial sort algorithm.

Based upon the above, the total time complexity of the exhaustive search method is $$T = O((n^2 - n)/2 \log k)$$
$$= O(n^2 \log k)$$
$$= O(n^2)$$

Therefore, the overall time complexity of the exhaustive search method for finding the 'k' largest difference values from a set X of 'n' arbitrary numbers is $O(n^2)$.

The method of the present invention differs from the above-described exhaustive approach in that, rather than finding all of the possible difference values exhaustively, it creates an optimal solution space from the input set X of arbitrary numbers 'n'.

Figure 2:
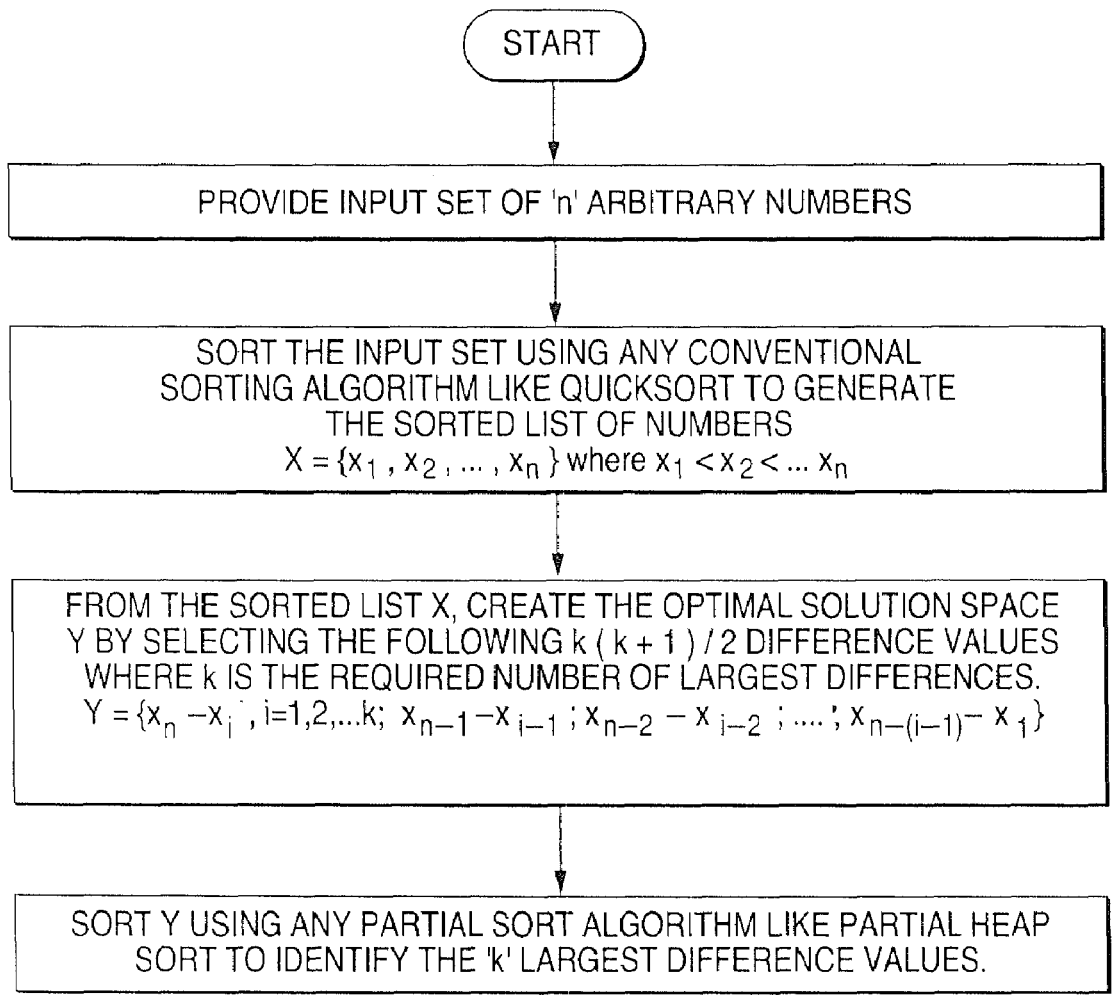
FIG. 2 is a flow chart illustrating a method for identifying the 'k' largest differences from a list of 'n' arbitrary numbers in accordance with the concepts of the present invention.

Referring to the FIG. 2 flow chart, a method in accordance with the present invention begins by using any conventional sorting algorithm to sort the input set of arbitrary numbers n to generate a sorted list $X = \{x_1, x_2, \ldots x_n\}$, where $x_1 < x_2 < \ldots < x_n$. For example, the conventional quick sort or heap sort algorithm may be used for sorting the arbitrary numbers to produce the set X. The time-complexity of these sorting algorithms is O(n log n).

The following property of a sorted list of numbers X is then used in the method of the present invention to find the optimal solution space Y of the 'k' largest differences. Consider the following sets of difference values arranged in the matrix provided below. The proposed method does not require the construction of this matrix. The matrix is provided to demonstrate that, after sorting the input list of numbers, an optimal solution can be arrived at that is guaranteed to contain the top 'k' difference values.

| | | | | | | | |
|---|---|---|---|---|---|---|---|
| Set 1: $x_n - x_1$ | | | | | | | |
| Set 2: $x_n - x_2$ | $x_{n-1} - x_1$ | | | | | | |
| Set 3: $x_n - x_3$ | $x_{n-1} - x_2$ | $x_{n-2} - x_1$ | | | | | |
| Set 4: $x_n - x_4$ | $x_{n-1} - x_3$ | $x_{n-2} - x_2$ | $x_{n-3} - x_1$ | | | | |
| Set 5: $x_n - x_5$ | $x_{n-1} - x_4$ | $x_{n-2} - x_3$ | $x_{n-3} - x_2$ | $x_{n-4} - x_1$ | | | |
| Set 6: $x_n - x_6$ | $x_{n-1} - x_5$ | $x_{n-2} - x_4$ | $x_{n-3} - x_3$ | $x_{n-4} - x_2$ | $x_{n-5} - x_1$ | | |
| ... | ... | ... | ... | ... | ... | ... | ... |
| ... | ... | ... | ... | ... | ... | ... | ... |
| ... | ... | ... | ... | ... | ... | ... | ... |
| Set I: $x_n - x_i$ | $x_{n-1} - x_{i-1}$ | $x_{n-2} - x_{i-2}$ | $x_{n-3} - x_{i-3}$ | $x_{n-4} - x_{i-4}$ | $x_{n-5} - x_{i-5}$ | ... $x_{n-(i-1)} - x_1$ | |

Entries in the above matrix are differences between the members of all possible pairs of numbers in the set X. The same matrix has the following properties:

1) Set # 'I' ($i^{th}$ row) of the matrix contains 'i' entries.
2) Entries (differences) along any column in the matrix are in descending order, i.e., $$a_{i,j} > a_{i+1,j} > a_{i+2,j} > a_{i+3,j} > \ldots, \text{ where } a_{i,j} = x_j - x_i$$

3) Entries (differences) along any diagonal in the matrix are in descending order, i.e., $$a_{i,j} > a_{i+1,j+1} > a_{i+2,j+2} > a_{i+j+3} > \ldots, \ldots$$

4) The value $(x_n - x_i)$ is the largest difference in the matrix.

From the above properties of sorted numbers arranged as shown in the matrix, it can be inferred that the second largest difference is either $(x_n - x_2)$ or $(x_n - x_i)$, because all of the other differences are smaller than one of these two entries as one traverses down the matrix. Similarly, the third largest difference will be one of the elements of Set 3 plus the remaining element of Set 2 (after the second largest difference is chosen).

Using the above criterion, it is guaranteed that the 'k' largest differences will be present among the elements belonging to Set 1 through Set k of the matrix. This means that, rather than searching through all of the possible differences ($n^2$) as is required in the exhaustive approach described above, the search can be restricted to $$1+2+3+\ldots+k = k(k+1)/2 \text{ values}$$

to identify the 'k' largest differences. The search space is, thus, reduced from $(n^2-n)/2$ in the exhaustive approach to $k(k+1)/2$ using the above-identified property of sorted numbers. As discussed above, the method in accordance with the present invention, it is not necessary to actually construct the above matrix. Rather, the list of $k(k+1)/2$ difference values is prepared and used in the next step in the method, as described below.

After the list of $k(k+1)/2$ difference values has been formed, any conventional partial sort algorithm (e.g., the partial heap sort) may be applied to identify the 'k' largest difference values. The typical time complexity of this operation will be $O(k^2 . \log k)$, which is independent of 'n', the size of the input list X.

If there is a sorted list to begin with, then the problem can be solved in constant time. The complexity of the algorithm in this case is $O(k^2 \log k)$.

The above analysis holds true even if there are repeated entries $x_i$ in the input list X.

The method of the present invention for finding the 'k' largest differences is, therefore, limited only by the time complexity of the conventional algorithm used to sort the input list of numbers. A typical complexity for such an algorithm is $O(n . \log n)$. The remainder of the method, being of complexity $O(k^2 \log k)$, does not add to the total complexity when $k << n$. In the case where an initial number sort is not needed, i.e., if a sorted list of numbers is available, then, as stated above, this problem can be solved in constant time using the above-described algorithm. Moreover, as long as 'k' remains constant, increasing the value of 'n' does not add to the runtime of the algorithm. On the other hand, the complexity of the conventional exhaustive method described above is $O(n^2 \log k)$. Thus, the method of the present invention is much more efficient than the exhaustive method when $k << n$. However, as 'k' approaches 'n', the complexity of the method of the invention becomes comparable to that of the exhaustive method.

The method of the present invention is also efficient in terms of memory complexity. The memory requirement of the exhaustive method is $O(n^2)$; the memory requirement for the method of the present invention is either $O(k^2)$ or $O(n)$, whichever is larger.

As mentioned above, an application of this new method has been identified in clock-skew analysis for large digital ICs. Clock skew is the difference in the arrival times of the clock signal between any two flops. A typical clock-tree may contain hundreds of thousands of clock paths from the clock source pin to the clock pins of different flops. It is required to find the few largest skew values with corresponding flop pairs. Circuit designers use this information to perform statistical analysis that helps them to control clock skew in the designs.

This problem is difficult to address with any conventional method due to the sheer size of the clock-tree. The size of the list of differences is even larger. However, the method of the present invention handles this problem efficiently. For example, let us consider a typical case in which the clock-tree contain $10^5$ clock paths and it is required to find 10 skew values, i.e., $n=10^5$ and $k=10$. Using the conventional exhaustive search method, the solution space would contain $5*10^9$ difference values, a very large number. However, as demonstrated in the method of the invention, once the input list of $10^5$ delay values is sorted using any conventional sorting algorithm, the size of the solution space can be reduced to only 55 difference values. These 55 difference values are guaranteed to contain the required top 10 skew values. Even if 'n' increases from $10^5$ to $10^{15}$ and 'k' remains constant at $k=10$, the size of the solution space remains constant at 55. Thus, the method of the invention reduces the size of the solution space independent of 'n' as long as 'k' remains constant. Since in all typical applications, $k << n$, the method of the invention is much more efficient than any conventional method.

It should be understood that the particular embodiments of the invention described above have been provided by way of example and that other modifications may occur to those skilled in the art without departing from the scope and spirit of the invention as expressed in the appended claims and their equivalents. For example, those skilled in the art will appreciate that the methods disclosed above may be implemented in machine-readable form and executed on conventional data processing systems such as that described above in conjunction with FIG. 1.

The invention claimed is:

1. A method of finding the largest 'k' clock delay values from 'n' clock delay values, the method comprising:
    providing an input set of 'n' clock skew delay from clock paths of a digital integrated circuit design;
    using a sort algorithm to sort the input set of 'n' clock delay values to generate a sorted list of clock delay values $X=\{x_1, x_2, \ldots, x_n\}$, where $x_1<x_2<\ldots x_n$;
    from the sorted list of clock delay values X, creating an optimal solution space Y by selecting the $k(k+1)/2$ clock delay values, where k is the number of largest clock delay values and $Y=\{x_n-x_i, i=1, 2, \ldots k; x_{n-1}-x_{i-1}; x_{n-2}-x_{i-2}; \ldots; x_{n-(i-1)}-x_1\}$; and
    using a partial sort algorithm to sort the optimal solution space Y to identify the 'k' largest clock delay values.

* * * * *